US012355638B2

(12) United States Patent
Hassane et al.

(10) Patent No.: US 12,355,638 B2
(45) Date of Patent: Jul. 8, 2025

(54) TRACEABILITY BASED IMPACT ANALYSIS

(71) Applicants: TELEFONAKTIEBOLAGET LM ERICSSON (PUBL), Stockholm (SE); Omar Hassane, Montreal (CA); Sadaf Mustafiz, North York (CA); Ferhat Khendek, Montreal (CA); Maria Toeroe, Montreal (CA)

(72) Inventors: Omar Hassane, Montreal (CA); Sadaf Mustafiz, North York (CA); Ferhat Khendek, Montreal (CA); Maria Toeroe, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 792 days.

(21) Appl. No.: 17/616,095

(22) PCT Filed: Jun. 4, 2020

(86) PCT No.: PCT/IB2020/055288
§ 371 (c)(1),
(2) Date: Dec. 2, 2021

(87) PCT Pub. No.: WO2020/245770
PCT Pub. Date: Dec. 10, 2020

(65) Prior Publication Data
US 2022/0300309 A1 Sep. 22, 2022

Related U.S. Application Data

(60) Provisional application No. 62/858,383, filed on Jun. 7, 2019.

(51) Int. Cl.
H04L 41/40 (2022.01)
G06F 9/455 (2018.01)

(52) U.S. Cl.
CPC .............. H04L 41/40 (2022.05); G06F 9/455 (2013.01)

(58) Field of Classification Search
CPC .. G06F 9/455; G06F 9/45558; G06F 11/3006; G06F 11/3636;
(Continued)

(56) References Cited

U.S. PATENT DOCUMENTS

2020/0007413 A1* 1/2020 Kerpez .................. H04L 41/40

FOREIGN PATENT DOCUMENTS

WO 2019/043622 A1 3/2019

OTHER PUBLICATIONS

Mustafiz, S., Dupont, G., Khendek, F., Toeroe, M.: Maple: An integrated environment for process modelling and enactment for NFV systems. In: Pierantonio, A., Trujillo, S. (eds.) ECMFA 2018. LNCS, vol. 10890, Springer, Cham (2018) (Year: 2018).*
(Continued)

Primary Examiner — Jacob D Dascomb
(74) Attorney, Agent, or Firm — Ericsson Canada Inc.

(57) ABSTRACT

The disclosure relates to a method, system and computer readable media for redesigning and redeploying a network service (NS) upon determining that a running instance of the NS fails to meet at least one NS requirement. The method comprises detecting a change in at least one input model of a NS design; executing a traceability analysis for the change in the at least one input model of the NS design; and upon determining, based on the traceability analysis, that the NS fails to meet the at least one NS requirement, redesigning and redeploying the NS.

15 Claims, 17 Drawing Sheets

(58) Field of Classification Search
CPC ........... G06F 2009/45595; H04L 43/20; H04L 43/10; H04L 43/12; H04L 41/40; H04L 41/0895; H04L 41/12
See application file for complete search history.

(56) References Cited

OTHER PUBLICATIONS

M. Barbero, M. Didonet, D. Fabro, and J. Bezivin. Traceability and provenance issues in global model management. In 3rd ECMDA-Traceability Workshop (ECMDA-TW), 2007 (Year: 2007).*
B.J.M. Abma: "Evaluation of requirements management tools with support for traceability-based change impact analysis"; XP055722225; Sep. 10, 2009.
Anonymous: Requirements traceability (Wikipedia); XP055721144; May 24, 2019.
Galvao, Ismenia et al.: "Survey of Traceability Approaches in Model-Driven Engineering"; XP031161482; Oct. 1, 2007.
International Search Report and Written Opinion of PCT/IB2020/055288 dated Aug. 21, 2020.

\* cited by examiner

```
Element : "Vdu:vdu-VC"
Impact at Metamodel level: "Impactful"
Impact at model level: "Impactful"
Impacted Transformations: "GeneratingFG, SM2NSD, OntologyUpdate, NSDRefinement"
Impacted Models: "UML_SM7c2c99aa0e919d4a, UML_SM397f225df51cece2,
UML_NSD3910346eb2782300, SMAP, NSDescriptor, NewOntology"
Impacted Model Elements:  "UML_SM7c2c99aa0e919d4a|Functionality[VoiceCall],
                          UML_SM397f225df51cece2|Functionality[VoiceCall],
                          UML_SM397f225df51cece2|ArchBlock[AS],
UML_SM397f225df51cece2|NonFunctionalRequirement[NFR3(MCS:8),
NFR1(T:400)], SMAP|ArchDep(AS-S, AS-HSS, AS- IMSLoc),
SMAP|InterfaceInfo(AS-ISC, AS-HSS, AS- SH),NSD|VNFD(AS),
 NSDescriptor|VNFFGD|VNFFGD CONTROL PLANE]
,NSDescriptor|NFPD|NFP-VoiceCall1],NSDescriptor|NsDf|NsDf-NsDf - NSD: VoIP (From :
PreVNFFG 1-AFG 8-FFG 1 )-001],NSDescriptor|VNFProfile(AS], NSDescriptor|VnfDf(VnfDf1),
NSDescriptor|InsLvl(InsLvl2)"
```

(a) Impactful Vdu Element

```
Element : "Vdu:vdu-Mess"
Impact at Metamodel level:
"Impactful"
Impact at model level: "Impactless"
Impacted Transformations: "Null"
Impacted Models: "Null"
Impacted Model Elements:  "Null"
```

(b) Impactless Vdu Element

Figure 10A

```
Element : "InstantiationLevel:InsLvl1 (from VNFD)"
Impact at Metamodel level: "Impactful"
Impact at model level: "Impactful"
Impacted Transformations: "GeneratingFG, SM2NSD, OntologyUpdate, NSDRefinement"
Impacted Models: "UML_SM7c2c99aa0e919d4a, UML_SM397f225df51cece2,
UML_NSD3910346eb2782300, SMAP, NSDescriptor, NewOntology"
Impacted Model Elements: "UML_SM7c2c99aa0e919d4a!Functionality(VoiceCall),
                          UML_SM397f225df51cece2!Functionality(VoiceCall),
                          UML_SM397f225df51cece2!ArchBlock(AS),
UML_SM397f225df51cece2!NonFunctionalRequirement(NFR3(MCS:8),
NFR1(T:400)), NSDescriptor!VNFFGD(VNFFGD CONTROL PLANE]
,NSDescriptor!NFPD(NFP-VoiceCall1],NSDescriptor!NsDf(NsDf-NsDf-NSD: VoIP (From :
PreVNFFG 1-AFG 8-FFG 1 )-001],NSDescriptor!VNFProfile(AS),NSDescriptor!VnfDf(VnfDf1),
NSDescriptor!InsLvl(InsLvL2)"
```

(c) Impactful Instantiation Level Element

```
Element : "SwImageDesc"
Impact at Metamodel level:
"Impactless"
Impact at model level: "Impactless"
Impacted Transformations: "Null"
Impacted Models: "Null"
Impacted Model Elements: "Null"
```

(d) Impactless SwImageDesc Element

Figure 10B

TRACEABILITY BASED IMPACT ANALYSIS

PRIORITY STATEMENT UNDER 35 U.S.C. S.119(E) & 37 C.F.R. S.1.78

This non-provisional patent application claims priority based upon the prior U.S. provisional patent application entitled "TRACEABILITY BASED IMPACT ANALYSIS", application No. 62/858,383, filed Jun. 7, 2019, in the names of HASSANE et al.

TECHNICAL FIELD

The present disclosure relates to network function virtualization.

BACKGROUND

Traceability information in model-driven engineering (MDE) can be classified as generic (no semantics retained with trace links) or specific (domain-dependent with semantically rich links). Traceability information can be represented as models conforming to an external metamodel (extra-model traceability), or as part of the traced models (intra-model traceability) thus requiring the metamodels of the traced models to be extended and polluted with trace information.

Traceability metamodelling can follow a pure metamodel approach or a tag-based approach. In the first approach, all the required trace types along with their usage semantics are specified at the metamodel level making the traceability metamodel rigid to change and therefore hard to reuse in other projects. The trace tagging approach uses a general traceability metamodel which can be annotated with specific tags. This allows for more flexible traces that can be used in any project, but with weak usage semantics specified in the metamodel.

When referring to traceability at the model transformation level, the trace links are between the elements of the source and target artifacts associated with the transformation. A trace model is created for each transformation. This is referred to as local traceability or traceability in the small.

SUMMARY

There is provided support for automatic generation of local and global traceability information during process enactment. The approach starts with a process model and a set of resources (metamodels, profiles and their model instances), which are all registered in a megamodel. A transformation chain is then created based on the process model with the help of the megamodel. When process enactment begins, the transformation chain is augmented with traceability support on the fly. During the enactment of the process model, the underlying transformations are executed and the target models are generated including the trace models (transformation traces). Trace links are generated both at the model-level and at the model element-level and the generated artifacts are retained in the megamodel. The global trace map, which provides traceability information at the process model-level is also part of the megamodel.

Using this traceability information, change impact analysis can be carried out at metamodel and model levels to assess whether changes in the building blocks, for example, of a network service, such as the virtual network functions (VNFs), have any impact on the network service design process and the generated models.

There is provided a method for redesigning and redeploying a network service (NS) upon determining that a running instance of the NS fails to meet at least one NS requirement. The method comprises the steps of detecting a change in at least one input model of a NS design; executing a traceability analysis for the change in the at least one input model of the NS design; and upon determining, based on the traceability analysis, that the NS fails to meet the at least one NS requirement, redesigning and redeploying the NS.

There is provided a system for redesigning and redeploying a network service (NS) upon determining that a running instance of the NS fails to meet at least one NS requirement. The system comprises processing circuits and a memory. The memory contains instructions executable by the processing circuits whereby the system is operative to detect a change in at least one input model of a NS design; execute a traceability analysis for the change in the at least one input model of the NS design; and upon determining, based on the traceability analysis, that the NS fails to meet the at least one NS requirement, redesign and redeploy the NS.

There is provided a non-transitory computer readable media having stored thereon instructions for redesigning and redeploying a network service (NS) upon determining that a running instance of the NS fails to meet at least one NS requirement. The instructions comprise any of the steps described herein.

The method, system and computer readable media provided herein present improvements to the way method, system and computer readable media related to the field of network function virtualization operate.

BRIEF DESCRIPTION OF THE DRAWINGS

FIGS. 10a and 10b illustrate VNF descriptor (VNFD) change impact results in MAPLE-T.

DETAILED DESCRIPTION

Figure 1:
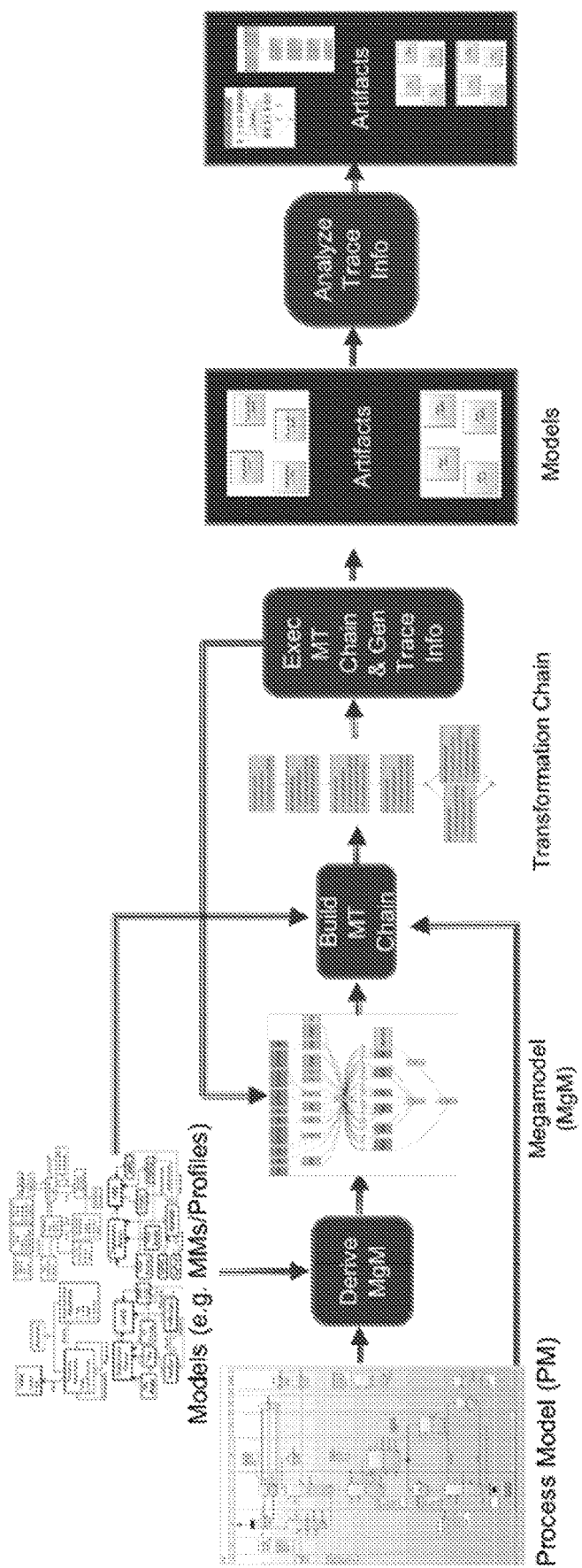
FIG. 1 is a schematic illustration of the MAGIC Process Modelling and Enactment Environment-enhanced with traceability (MAPLE-T) approach.

Various features will now be described with reference to the figures to fully convey the scope of the disclosure to those skilled in the art.

Many aspects will be described in terms of sequences of actions or functions. It should be recognized that according to some aspects, some functions or actions could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed.

The Network Functions Virtualization (NFV) paradigm is heading towards an evolution with the recent zero-touch automation initiative. In particular, automating the orchestration and management of network services (NS) could progress rapidly with the help of model-driven engineering methods and tools. MAPLE is an integrated process modelling and enactment environment for NS management. Enactment is enabled by transformation chaining and megamodelling. In this disclosure, an extension, MAPLE-T, is presented, which incorporates traceability information generation and analysis support in MAPLE. MAPLE-T allows the generation of both local and global traceability information during the enactment of a process model (PM), all of which is retained in the megamodel. The megamodel enables end-to-end navigation of the source and target artifacts in the PM and thus allows advanced traceability analysis to be carried out. MAPLE-T is applied on a NS design process to demonstrate the application of the change impact analysis feature.

With the advent of the Fifth Generation (5G), the telecommunications industry is faced with opportunities and challenges which require rapid innovations. Traditional networks have high dependence on proprietary hardware. Telecoms are moving from such networks to virtualized networks. Telecoms are leveraging the Network Functions Virtualization (NFV) paradigm which is a key enabler for 5G. NFV builds on cloud computing and virtualization technologies which enable the automation of the orchestration and the management of network services (NS). Model-driven engineering (MDE) methods and tools can help with the automation.

As a first step, an approach for explicitly modelling and enacting NFV processes is applied to the NS design and management process. The NS Management Process Model is compliant with the NFV reference framework. MAGIC Process Modelling and Enactment Environment (MAPLE) has been developed as part of a project called "MAGIC" and provides an integrated environment for creating and enacting process models (PM) with the use of model transformation chains. Transformation chaining is the preferred technique for modelling the composition of different model transformations and orchestrating them. MAPLE supports the enactment of heterogeneous (cross-technology) transformation chains based on megamodels used for supporting model management, and on composition of transformations. Megamodels provide complex structures to link all relevant artifacts (models, transformations, and other metadata) forming a map for model management. MAPLE was built in the Eclipse Papyrus environment, which is the modeling environment of choice of the European Telecommunications Standards Institute (ETSI) NFV.

Advanced support for discoverability and traceability have been identified as needed features in virtualizing network services. Traceability support enables information recovery, origin tracking (for instance, backtracking from design to requirements artifacts), change impact analysis, change propagation, dependency visualization, and even defect detection and prediction. Traceability management can be effectively carried out with MDE methods and tools. While NFV would greatly benefit from end-to-end traceability support, there has been very little done in this regard in this domain.

In this disclosure, MAPLE is extended with traceability support for NFV systems. Means for local (transformation-level) and global (process model-level) traceability information generation are integrated and also provide the groundwork for change impact analysis. This is applied in the NFV domain to the traceability analysis of the network service design process in order to assess the impact of changes in the source models. The vendor-provided virtualized network function (VNF) form the core of a network service, and any changes in the VNF descriptors (VNFD) can affect the target artifacts and the process itself. It is therefore highly beneficial in NFV systems to be able to assess the impact of a change and to provide feedback.

Traceability is defined as the degree to which a relationship can be established between two or more products of the execution/enactment process, especially products having a predecessor-successor or master-subordinate relationship to one another. It is possible to execute or enact a development process such as the NS design, it is also possible to execute or enact a management process such as NS instantiation. Traceability applies to both the same way and even when the two are integrated into a single PM.

Traceability information in MDE can be classified as generic (no semantics retained with trace links) or specific (domain-dependent with semantically rich links). Traceability information can be represented as models conforming to an external metamodel (extra-model traceability), or as part of the traced models (intra-model traceability) thus requiring the metamodels of the traced models to be extended and polluted with trace information.

Traceability metamodelling can follow a pure metamodel approach or a tag-based approach. In the pure metamodel approach, all the required trace types along with their usage semantics are specified at the metamodel level making the traceability metamodel rigid to change and therefore hard to reuse in other projects. The trace tagging (tag-based) approach uses a general traceability metamodel which can be annotated with specific tags. This allows for more flexible traces that can be used in any project, but with weak usage semantics specified in the metamodel.

When referring to traceability at the model transformation level, the trace links are between the elements of the source and target artifacts associated with the transformation. A trace model is created for each transformation. This is referred to as local traceability or traceability in the small. However, the link between the different trace models across multiple model transformations (or a model transformation chain) is created to produce global traceability (or traceability in the large) information. This enables end-to-end navigation throughout a chain of intermediately created trace models.

MAPLE proposes an integrated process modelling and enactment approach and supports process modelling with unified modeling language (UML) Activity Diagrams. The MAPLE enactment approach is based on model transformation chaining and megamodelling. Megamodels (MgM) are used to manage all the resources needed for the enactment. It begins with a process model (PM) and the repository of resources (metamodels, profiles, model instances, model transformations, programs). In MAPLE, the MgM is used as a resource repository that aggregates and links all these resources as well as their metadata. This is quite useful for gathering and managing the relevant information regarding the transformations that need to be enacted.

An initial megamodel (MgM) is automatically derived based on the resources registered. When the PM is registered in the MgM, it leads to the creation of a weave model. This weave model binds the PM and the MgM together. The PM is then mapped to a model transformation chain, with the help of the MgM and the weave model, and it can be executed using token-based semantics. The MgM is dynamically updated with the generated models during enactment.

An improvement to a previous process enactment approach providing traceability support is presented herein. One goal is to go further and use the MgM for advanced traceability of model transformation chains. The MAPLE-T approach is shown in FIG. 1. Following the derivation of the megamodel (MgM) and the construction of the model transformation (MT) chain, the chain execution results in the generation of artifacts. During this execution, trace models will also be output (traceability in the small context) and will be retained in the MgM in order to build a global traceability map (traceability in the large context). The global traceability map can then be used for traceability analysis. As an add-on, the map can also be used as a basis for traceability visualization.

Traceability support for process enactment can be incrementally built in three stages: 1) traceability information generation, 2) traceability analysis, and 3) traceability visualization. While traceability information generation is executed first, the latter two stages can be carried out in parallel.

Traceability Generation is now discussed. First, support for the generation of traceability information and global model management is built in MAPLE. Each of the transformation in the MT chain is first augmented such that trace models are generated as extra artifacts with the execution of each transformation. These local trace models are referred to as LTrace models.

During enactment, this augmented MT chain is executed, hence generating the output as defined in each transformation along with the LTrace model for every transformation. The generated artifacts, including the trace models, are dynamically added to the MgM during enactment. Each LTrace model in the MgM is connected to the relevant input and output models. In addition to the links between input and output models via the LTrace model, the links between the trace models are also saved in the MgM. The links retained are at the model-level as well as at the model-element level. This leads to the creation of the global traceability map within the MgM, which we refer to as the GTrace.

Traceability Analysis is now discussed. Once a repository of traceability information and the global traceability map is created, the next step is to discover any useful trace information that can be analyzed for a given purpose. Whether a piece of trace information is useful is typically application dependent. Discovering such trace links is possible when using a trace tagging method (known from Vanhooff, B., Van Baelen, S., Joosen, W., Berbers, Y.: Traceability as input for model transformations. In: ECMDA Traceability Workshop (ECMDA-TW) 2007. pp. 37-46. SINTEF (2007)).

In the MgM, each LTrace model is associated with a corresponding tag representing the context of the traced transformation. The purpose behind this tag is to specialize the trace models with application-specific semantics. In MAPLE-T, the notion of tags has been incorporated at two levels: at transformation rule level and at transformation level.

Referring again to FIG. 1, the main functionalities provided by MAPLE-T, are described. To enact a process model (PM), the first step is creating the PM. The Eclipse Papyrus Activity Diagram environment may be used to build PMs. In the example of FIG. 1, the PM complies with the ETSI Information Model for NFV as well as the ETSI NFV Papyrus Guidelines. The PM creation phase is outside the scope of this disclosure. For further details concerning the PM creation phase, the reader can refer to (Mustafiz, S., Dupont, G., Khendek, F., Toeroe, M.: MAPLE: An integrated process modelling and enactment environment. In: ECMFA 2018. pp. 164-178. Springer (June 2018)).

Figure 2:
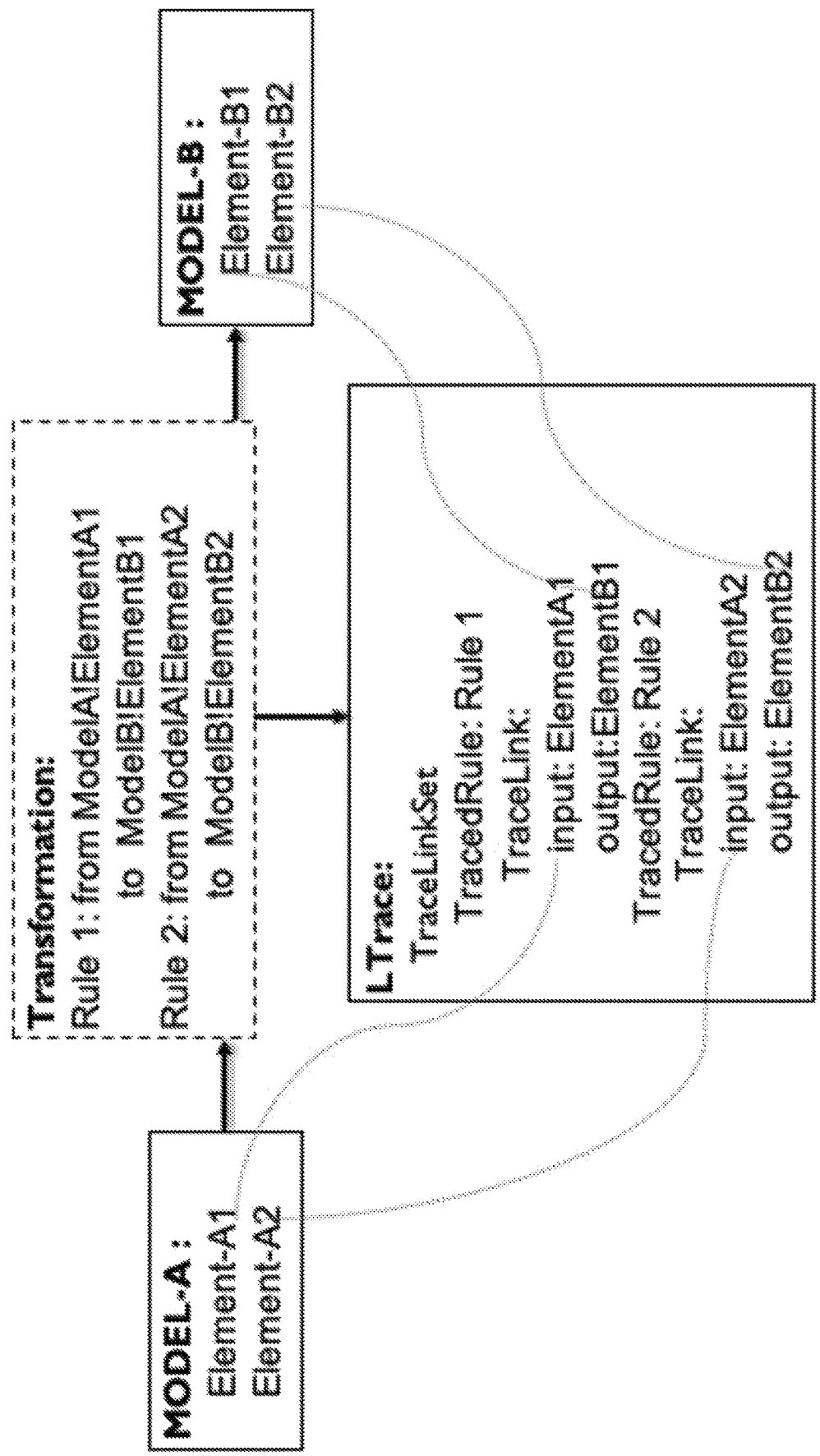
FIG. 2 is a diagram illustrating a local traceability (LTrace) Structure.

In MAPLE, the actions in the PM are implemented with model transformations. A transformation involves several input and output models, possibly conforming to different metamodels that can be expressed using heterogeneous technologies. Moreover, a PM can be implemented with a heterogeneous set of languages (for instance, ATL, Epsilon, Java, or C), and hence MAPLE supports execution of cross-technology model transformation chains. Due to this, deploying model management techniques is essential in MAPLE, and megamodels are used for this purpose. While megamodels have been very useful in MAPLE for managing resources and for enacting the PM, there is a need to go further and to use the MgM for advanced traceability support. In MAPLE-T, new traceability-related features are introduced in the MgM as well as new extensions with respect to the implementation of these features. To enable traceability at both levels (local and global), the MgM now supports storing the same resources with different versions over time, i.e whenever they are being used or changed. The MgM also retains model instances per enactment. In addition to that, each transformation resource is now linked with a trace model—representing local traceability (LTrace models). This LTrace model contains the trace links for each input and output of the transformation execution and conforms to an LTrace metamodel which represents local traceability information elements both at the model element-level and at the attribute-level. The main elements in the LTrace are TraceLinkSet, TracedRule and TraceLink and are also shown in FIG. 2.

TraceLinkSet: This represents the set of all the traced rules of a transformation execution as well as all the trace links linking input and output elements of the traced models.

TracedRule: This represents the rule responsible for creating/transforming the traced output model element(s) from the corresponding traced input model element(s).

TraceLink: This represents the set of input elements and their corresponding output elements within a rule.

Figure 3:
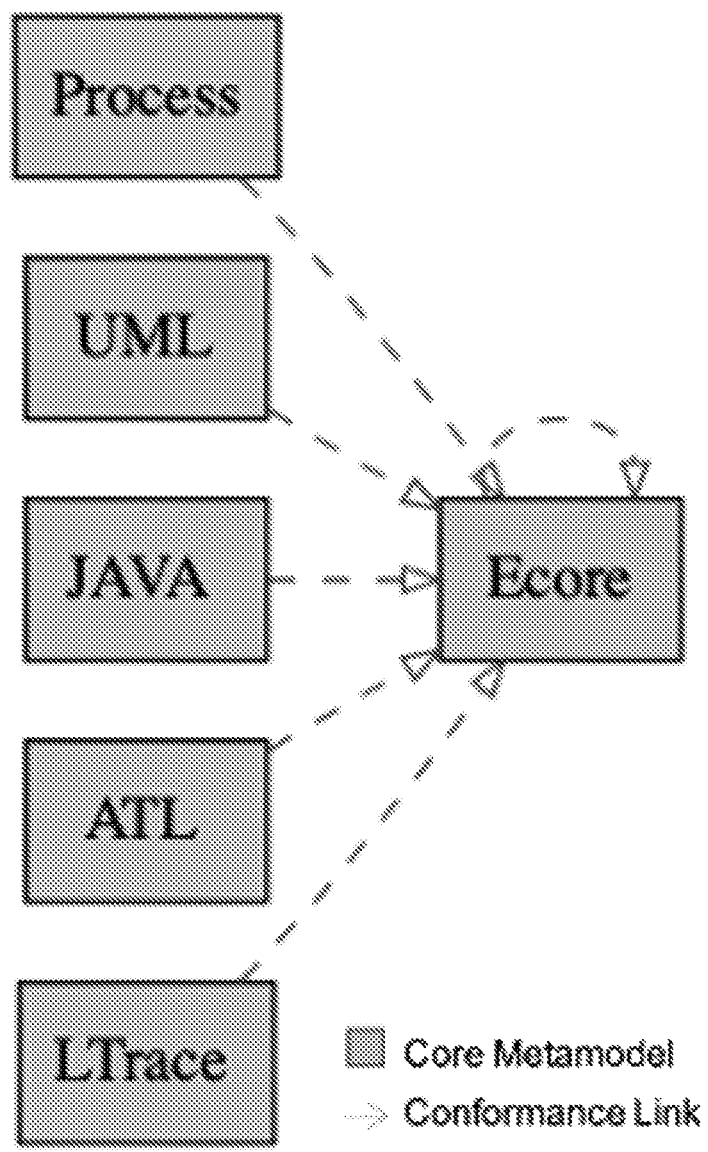
FIG. 3 is a diagram illustrating Base Megamodel (MgM).

The MgM is derived after registering the resources and the PM. First, a base MgM (see FIG. 3) is loaded as part of MAPLE-T environment and consists of the metamodels of the built-in loaders (used to load resources) and the pre-loaded meta-metamodels (e.g., Ecore) and their conformance links. This MgM is incrementally updated by registering the different resources which are part of the project (metamodels/profiles). This is carried out automatically by going through the project workspace (referred to as workspace discovery), and, as a result, an initial MgM is derived at this stage. A base LTrace metamodel conforming to the Ecore metamodel is also registered in the MgM (see FIG. 3). Each trace model generated as a byproduct of a transformation execution conforms to this metamodel.

As the next step, the MgM is refined by carrying out a PM discovery. This involves updating the MgM with new resources: the PM and the associated transformations. If the MgM should be PM-agnostic, a weave model is automatically created behind the scenes whenever a PM is registered. The weave model binds all the necessary elements of the PM to their equivalent resources in the MgM.

At this point, the MgM holds all the essential resources which are required for enactment. During enactment, the LTrace models generated are added to the MgM which makes it possible to construct the GTrace (part of the MgM).

The PM is given translational semantics by mapping it to a transformation chain. The chain is in essence a schedule with the required details (sequence of actions, transformations used, inputs and outputs of the transformations). This allows to build a generic enacter, instead of having an enacter for each kind of PM. Having a generic enacter also leaves scope for integrating other formalisms for modelling the PM.

The translation from a PM to an MT chain is implemented using an ATL transformation which takes relevant inputs (including the MgM and the PM) and produces the target transformation chain.

This phase of the process has no traceability-related extensions. It is however possible to augment the transformation chain to build a chain with traceability support. However, this gives less flexibility to the user (e.g. to enable or disable traceability within MAPLE-T during enactment).

In MAPLE-T, a PM is enacted by executing the underlying MT chain. Similar to UML Activity Diagrams, the generated chain is given token-based semantics. Therefore, the enacter developed is based on controlling the tokens and activating the actions when needed.

However, in order to support both local and global traceability, means were integrated to generate local traces as byproducts of each transformation execution part of the chain and to explicitly link these trace models in the MgM to get the global traceability map. The MgM is also updated with these new model instances and their relationships.

Figure 4:
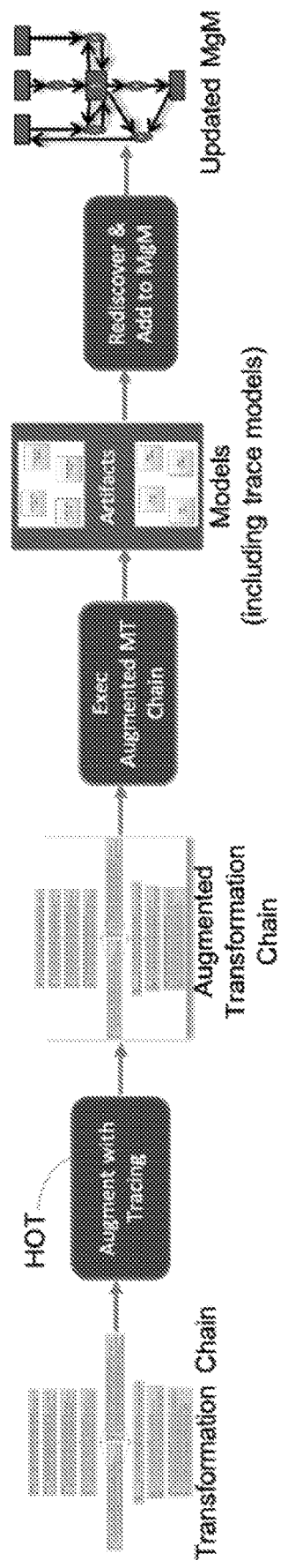
FIG. 4 is a schematic illustration of the MAPLE-T traceability generation approach.

One difficulty to address when building a traceability solution with MAPLE-T is how to actually generate traceability information during enactment. An approach was adopted that augments the transformation chain automatically with traceability information (see FIG. 4). The concept of higher order transformation (HOT) was used and a HOT was defined to systematically enrich the transformations with traceability notions. The HOT takes the transformations parts of the chain and augments them, resulting in a new chain which has the same flow but with traceability-augmented transformations. Each transformation ends up having, in addition to its original input/output parameters, a new target parameter representing the trace model to be generated—the LTrace model.

While MAPLE provides enactment support for a heterogeneous set of transformation languages (e.g., ATL, Java), MAPLE-T only supports implementations with ATL transformations at the time of this disclosure. The HOT implementation augments transformation models conforming to the ATL metamodel. Also, the LTrace metamodel is built to represent trace models produced from the execution of the augmented ATL transformations.

During enactment, the MgM is updated on the fly with the augmented transformation executions and their corresponding input/output instances including the LTrace models. Once the enactment is done, the MgM is completely updated with all the newly generated artifacts. At this point, the MgM also provides a global traceability map, the GTrace. The set of global links as well as the local traces generated for each transformation form the basis for carrying out traceability analysis in MAPLE-T.

Following the generation of traceability information, traceability analysis can be carried out on the basis of the GTrace. For this purpose, a means is incorporated to analyze trace information within MAPLE-T which can be easily extended and adapted to the targeted application domain. A core traceability analysis solution has been built, that exposes common traceability analysis features (via an API). The exposed features allow the generated LTrace models and GTrace links to be parsed and manipulated, typically with the use of the rule-level and transformation-level tags that provide richer semantics for the analysis.

Traceability analysis support is incorporated, specifically to carry out change impact analysis in MAPLE-T, which relies on the proposed traceability generation means. The change impact analysis is triggered by a request specifying the element or the model for which the change impact is to be analyzed. The purpose is to determine how impactful a model or an element is on the whole process (i.e, how impactful it is on the other involved models, model elements, and transformations) at both the metamodel and the model levels. The process starts first by filtering all the relevant information from the GTrace and LTrace models based on what was provided as input at the metamodel level. Based on this, it can be concluded whether the input is impactful or impactless at the metamodel level. In case it is impactless at the metamodel level, then it is inferred to be impactless at the model level as well. In this case, it is concluded that the input model or model element is impactless at both levels and no further analysis is required. On the other hand, if the input model or model element turns out to be impactful at the metamodel level, then the decision is not as straightforward as in the previous case. MAPLE-T then continues to analyze the gathered traceability information (LTrace models and GTrace links) at the model level as well. As a result, the impact decision is further categorized into two outcomes.

First the input may be impactful at the model level: this means that the provided input has been used in the enacted process and changing it requires re-enactment.

Additionally, the solution collects the set of all the impacted resources (models, model elements, and transformations) and provides them as outputs of the change impact analysis along with the impact decision.

Second, the input is impactless at the model level: this means that although the type of the input model/element has impact on the enacted process, the actual input model/element instance has never been used and has no impact on that specific enactment.

Hereinbelow, MAPLE-T is used to enact an NS design process and to carry out traceability analysis, and, in particular, a change impact analysis. The process is a subset of the NS Design and Deployment process model (PM).

A network service is a composition of network function(s) (NF) and/or other nested NSs to provide a desired functionality/behaviour (e.g. voice over internet protocol (VoIP)). An NF is a functional block identified by well-defined functional behaviour and external interfaces. NFs within an NS can be a physical NF (PNF) (e.g. a traditional firewall device) or a virtual network function (VNF) (e.g. a virtual firewall) decoupled from the infrastructure and implemented as software that can be deployed on a virtualized infrastructure. The different NFs/nested NSs within an NS are interconnected with one or more forwarding graphs (FG) that define the traffic flows between them.

Figure 5:
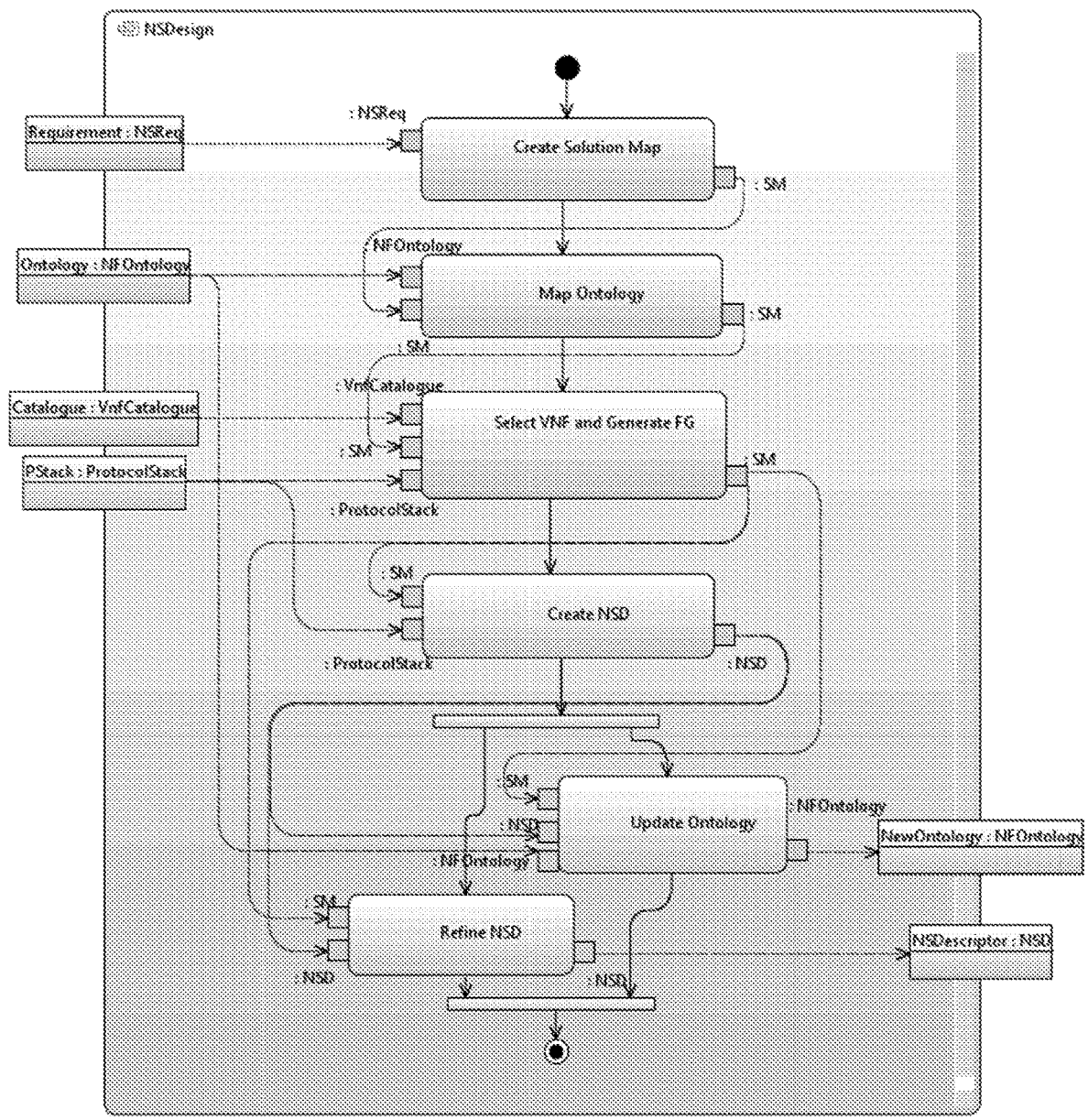
FIG. 5 is a diagram illustrating a network service (NS) design process model (PM).

One goal behind the NS design process may be to automatically design an NS and generate an NS Descriptor (NSD) which is a template used for the deployment and management of the NS. The process starts by specifying the functional and non-functional characteristics of the NS as the NS requirements (NSReq), which could also be referred as NS intent (i.e. intended purpose of the NS for which the NSD is designed). The functionalities in the NSReq are then decomposed with the help of an NF ontology (NFOntology) which represents a knowledge-base capturing known NF decompositions and their architectures. After decomposition, to a certain level, VNFs are selected from a catalog (VnfCatalogue) by matching the decomposed functionalities. The traffic flows in the NS are then defined with the design of the VNF FGs (VNFFGs) and the NS is dimensioned according to the non-functional requirements. The NFOntology may be updated with new information from NSReq after a successful design, with the onboarding of new VNFs, or manually by an expert. A VNF is described by a VNF descriptor (VNFD) which captures all its deployment characteristics. One main element within the VNF is a VNF component (VNFC) which represents an internal component of the VNF that provides part of the VNF functionality. A Virtual Deployment Unit (VDU) is the deployment template or descriptor of the VNFC and it is an element contained within the VNFD. The generated NSD may be compliant to ETSI NFV definition and refers to the NS constituent descriptors including VNFDs and VNFFG descriptors (VNFFGDs). For a detailed description of the NS Design process, the reader can refer to (Mustafiz, S., Nazarzadeoghaz, N., Dupont, G., Khendek, F., Toeroe, M.: A model-driven process enactment approach for network service design. In: SDL 2017: Model-Driven Engineering for Future Internet. LNCS, vol. 10567, pp. 99-118. Springer (2017)). FIG. 5 presents the NS design PM.

Figure 7:
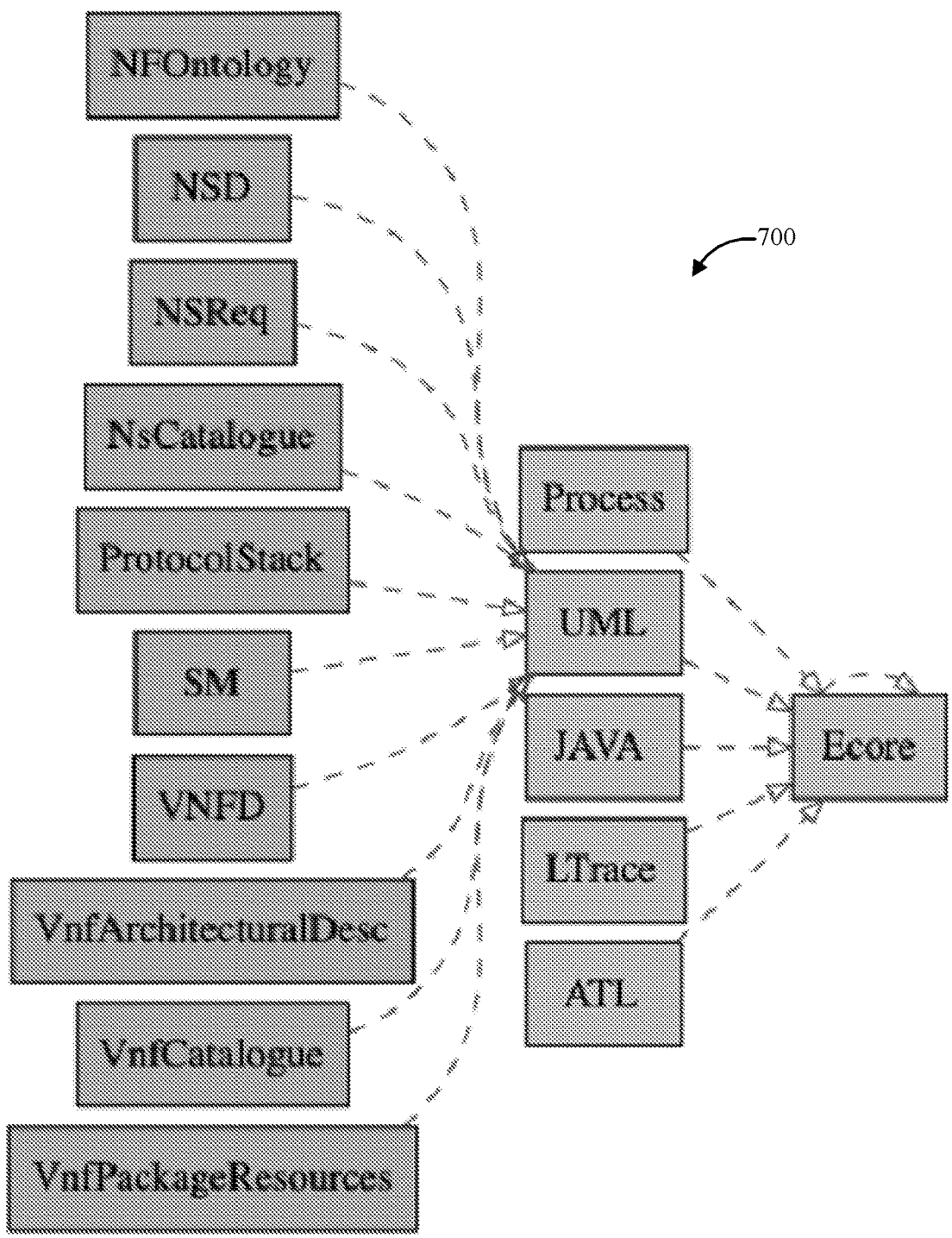
FIG. 7 is a diagram illustrating an initial NS design MgM.

In order to enact the NS design PM, all the needed resources/profiles (NSReq, NSD profiles, etc.) are registered. As a result, the base MgM (FIG. 3) is updated with all the registered UML profiles as well as conformance links. FIG. 7 shows the initial MgM 700 with UML profiles (also shown by the elements in box 801 in FIG. 8). Next, the PM is registered, which automatically registers all the underlying model transformations implementing the actions in the PM. Consequently, the MgM is updated (see FIG. 8) with the following: 1) a new resource representing the NS design PM as a UML activity diagram conforming to the UML metamodel 802; 2) the ATL transformations conforming to the ATL metamodel (shown by the elements in box 803); and also 3) the weave model containing the MgM and PM mappings 804. With this MgM, MAPLE-T has all the necessary resources to enact the PM, and therefore enables NS Design traceability generation and analysis.

Figure 6:
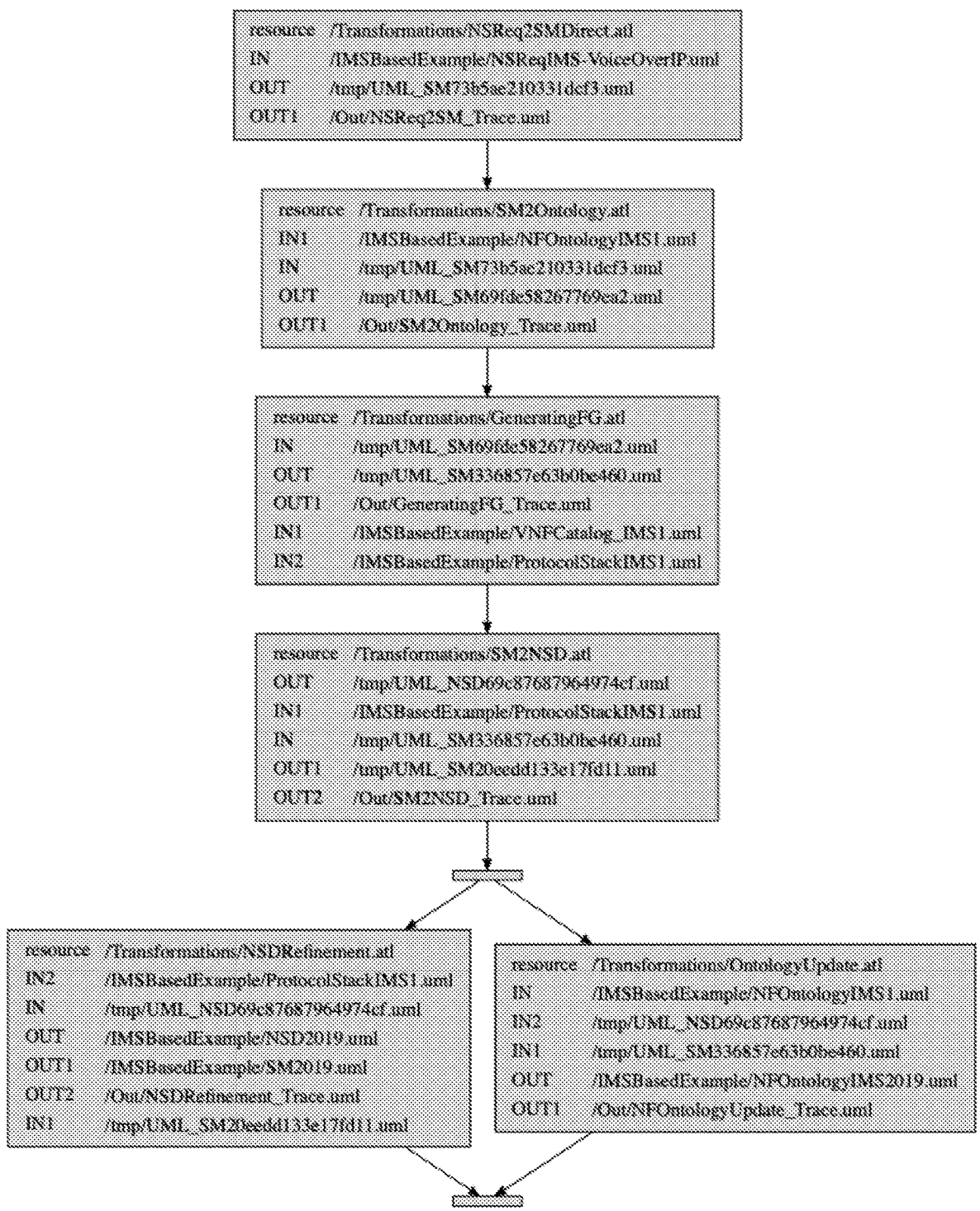
FIG. 6 is a diagram illustrating an augmented model transformation (MT) Chain.

Once all the model instances are specified, an initial transformation chain is built based on the NS design PM. This transformation chain is then augmented so that each transformation is able to generate LTrace model instances in addition to its original output model instance(s) (see FIG. 6).

The execution of this MT chain includes six augmented transformation executions. The first transformation starts by taking the NSReq model as input (this corresponds to the "Create solution map" box of FIG. 5 taking input NSReq, i.e. "IN" of the first box of FIG. 6) and generates an initial intermediate model (this corresponds to the output solution map model of the "Create solution map" box of FIG. 5 and "OUT" of the first box of FIG. 6, which becomes one of the inputs to the box "map ontology" of FIG. 5) as well as the LTrace model corresponding to that transformation execution (this corresponds to "OUT1" of the first box of FIG. 6). In the same way, the execution process continues according to the order defined in the MT chain. For each subsequent transformation execution, the LTrace model is generated and the intermediate model is incrementally refined until the desired models are obtained: NSD and updated NFOntology.

Figure 8:
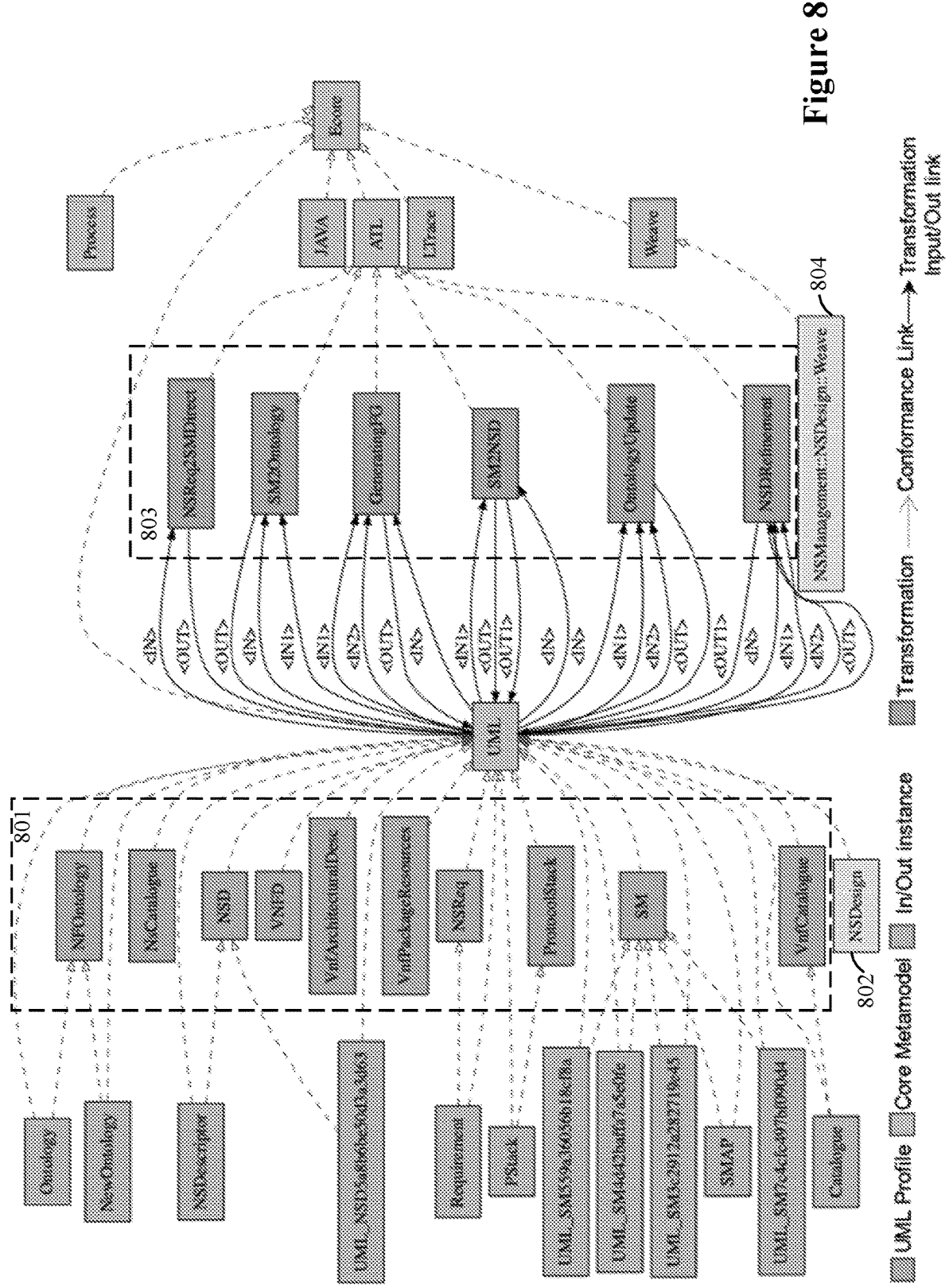
FIG. 8 is a diagram illustrating an updated NS design MgM.
Figure 9A:
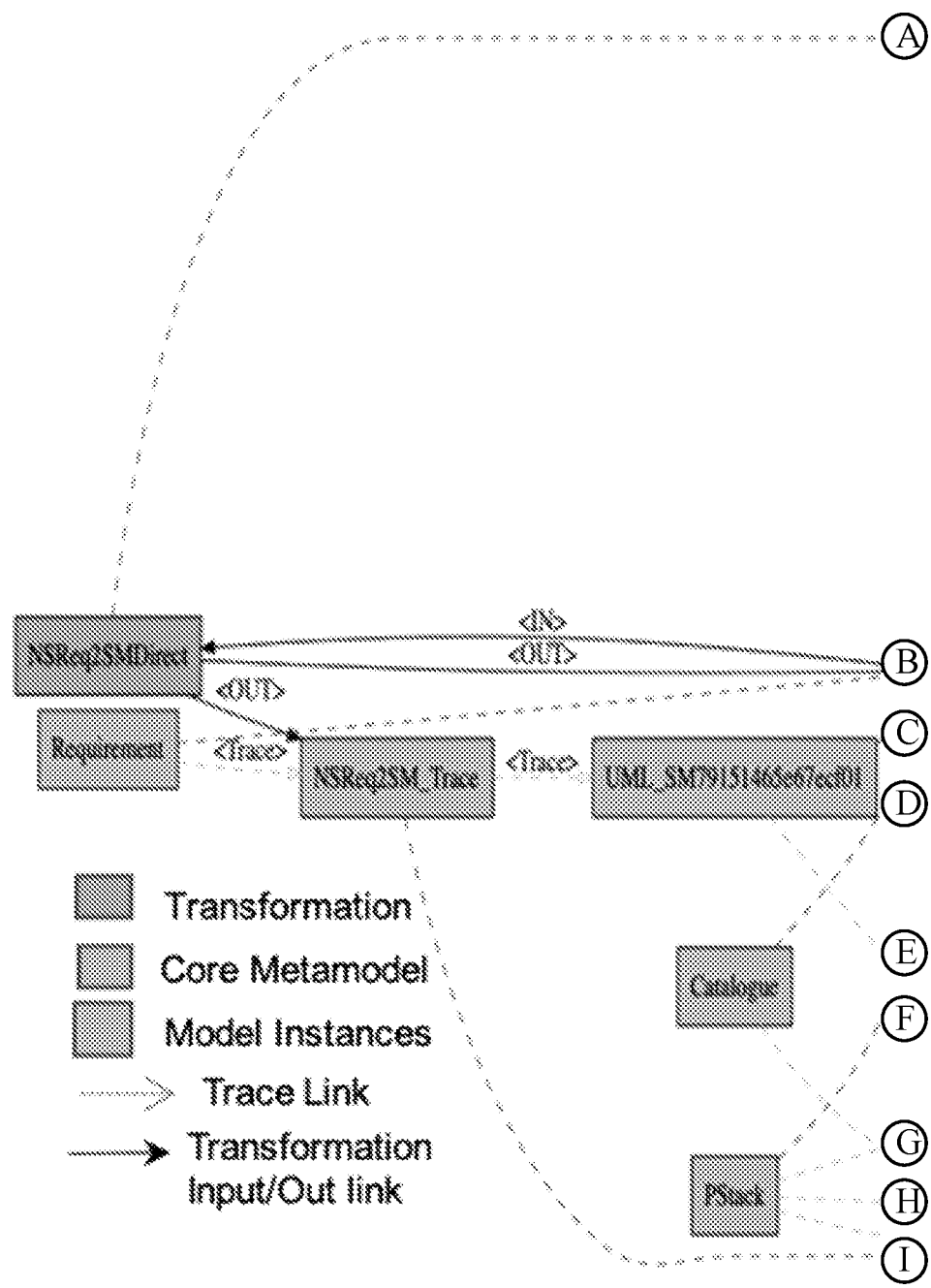
FIGS. 9a to 9d is an exploded diagram illustrating an NS design global traceability map within the MgM (GTrace).
Figure 9B:
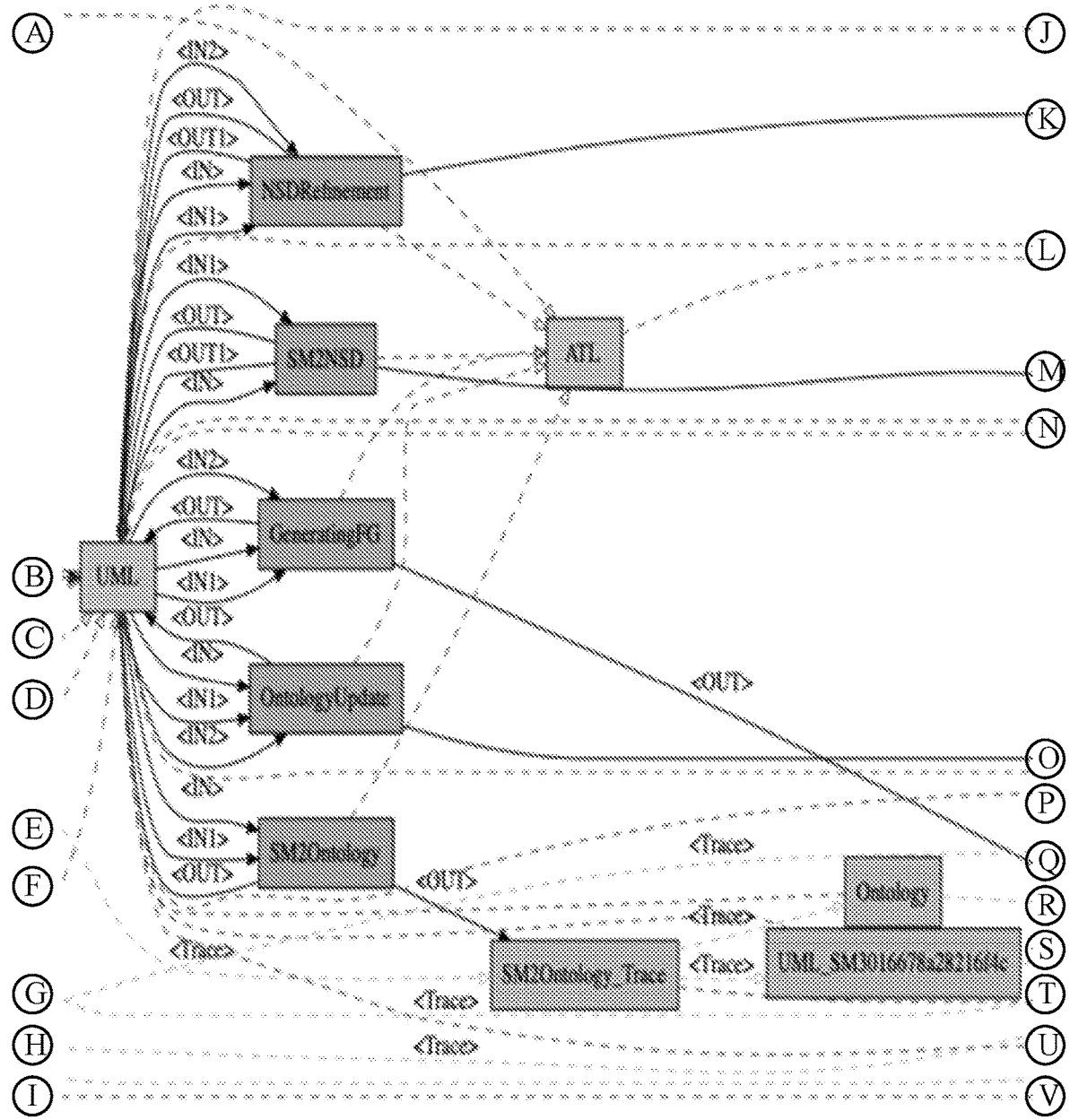
Figure 9C:
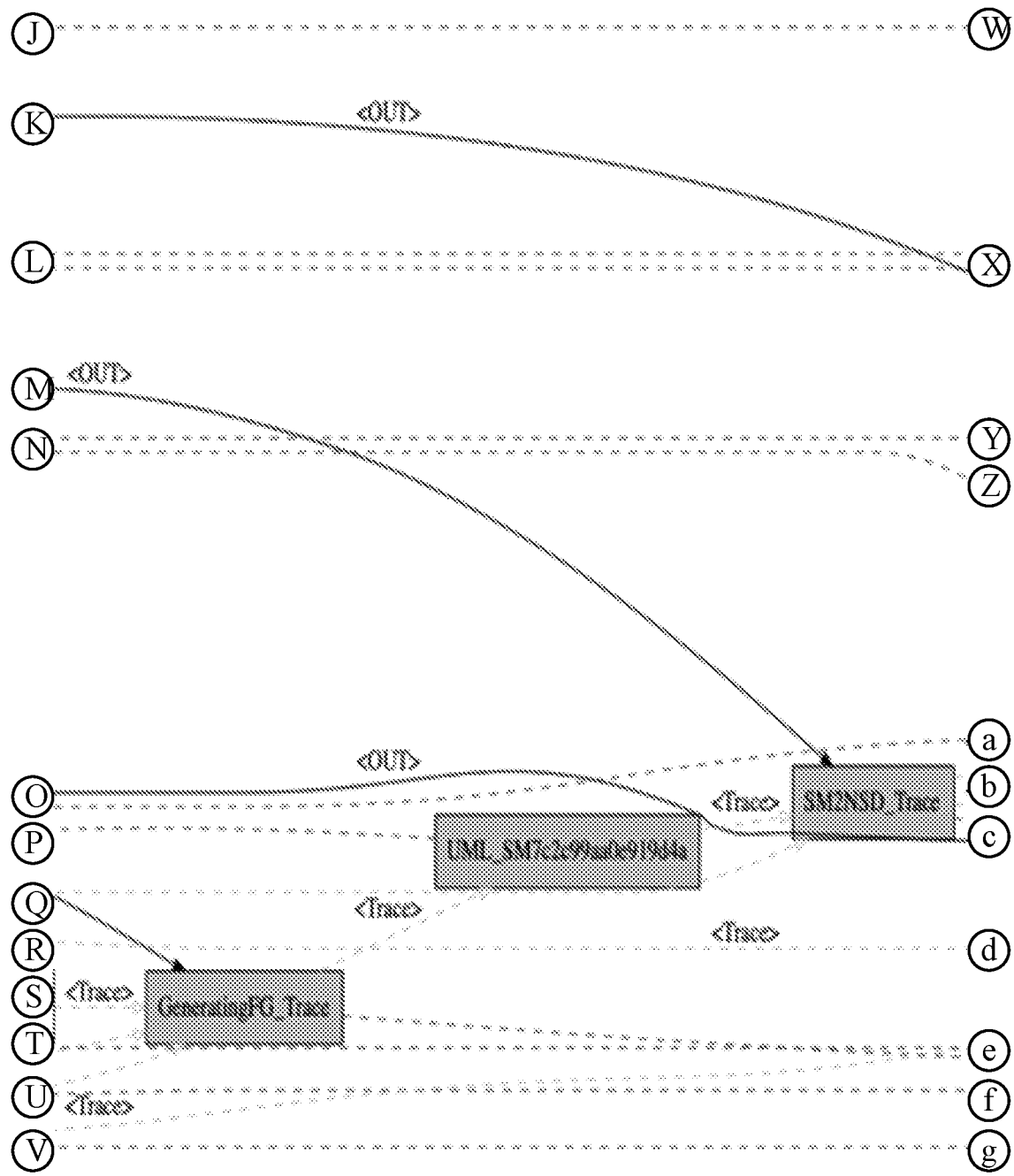
Figure 9D:
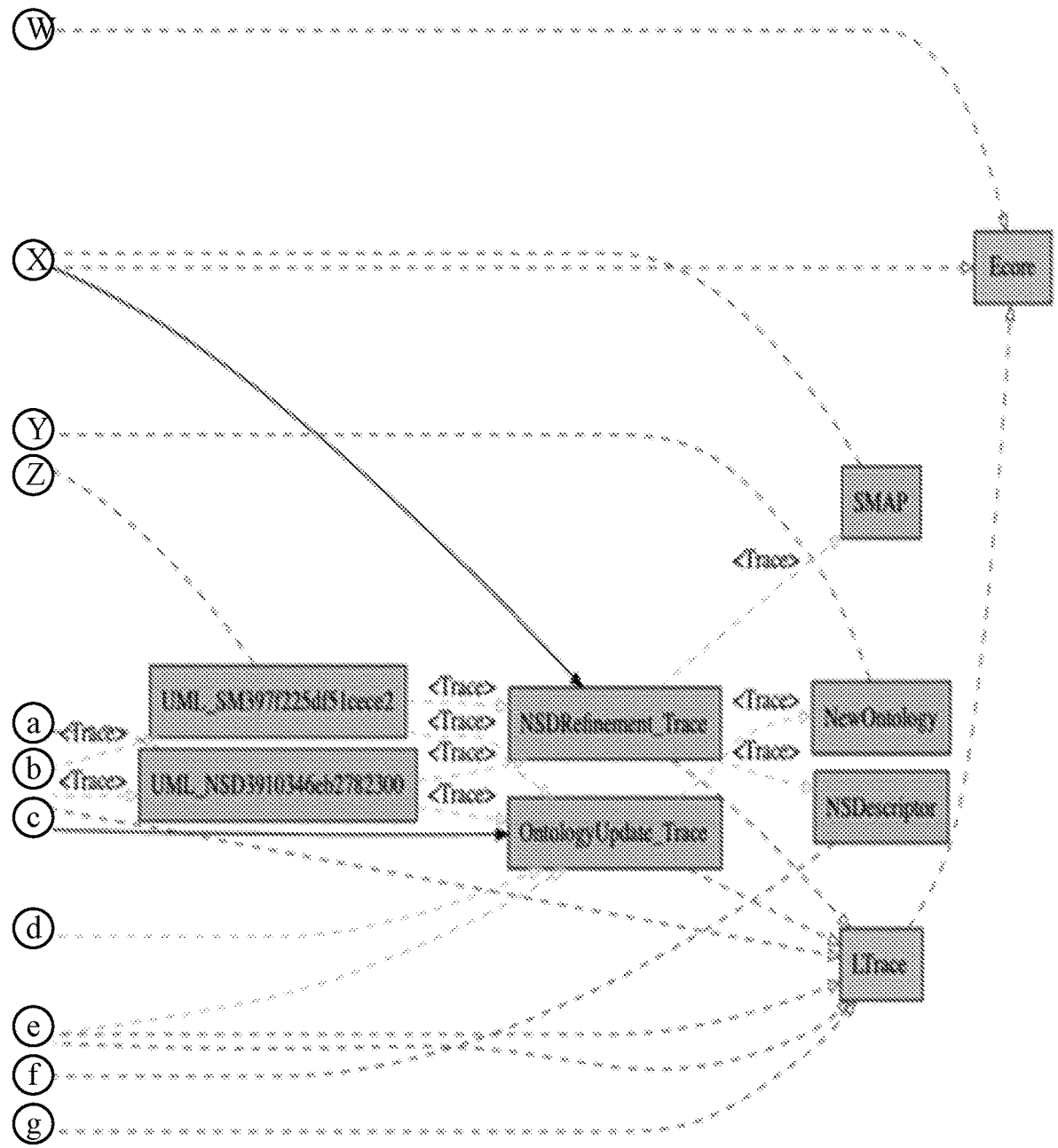

The MgM is updated during enactment with actual model instances (see FIG. 8 first column). The LTrace model instances along with the global links interconnecting them are also added to the MgM. This results in the construction of the NS Design GTrace. The subset of the MgM representing the NS Design GTrace is shown in FIG. 9. LTrace models (e.g, NSReq2SM_Trace, SM2NSD_Trace) are shown by boxes whose label are suffixed by "_Trace" and their interconnections, the GTrace links are shown with dashed links labelled <Trace>. Each LTrace model (output of a transformation) is linked with its corresponding model transformation with an object flow link (solid black line).

Once all the NS Design models are interlinked via LTrace models and GTrace links, it is possible to automatically trace back and forth between all the involved source and target resources i.e; Requirement—an instance of NSReq, Ontology—and instance of NFOntology, the Catalogue—an instance of VnfCatalogue and its constituent instances of VNFD as well as the resulting NSDescriptor—an instance of NSD and the updated NFOntology, which is also an instance of Ontology. Each LTrace model enables navigation at the element level of adjacent models. Additionally, the GTrace enables navigation at the PM level, which means that it is possible to explicitly navigate between distant models as well. For example, it is possible to directly trace back from the NSDescriptor (last element of the NS design process) to the Requirement (first element of the NS design process).

Because of the foundation set by the local and global traces, the change impact analysis can be incorporated in MAPLE-T. It is then possible to automatically figure out how changing an element of an input model (Requirement, VNFDs included in the Catalogue, or the Ontology) can impact the NS Design transformations and the target (e.g, NSDescriptor) models and their elements. Using MAPLE-T, the user selects the input element for which the change impact is to be determined. The user is then provided with the result showing whether the selected element is impactful or not, and, if applicable, a list is provided with all the impacted transformations and models as well as their elements.

Typically, a VNFPackage is provided by a vendor and might be subject to change. In the present case study, focus is specifically on the impact induced by changing a resource within the VNFPackage, mainly the VNFD. After an NS is deployed, a VNF vendor might point out that a parameter or set of parameters in a VNFD within the catalog is erroneous (not describing the VNF properly). In such a scenario, the decision about making a change in the design process and associated artifacts depends on whether the error prevents the running NS instance from behaving according to the requirements (Requirement) or not. With the present traceability analysis, it is possible to determine whether the erroneous parameters have an impact on the NS design process and therefore the generated NSD. This allows to evaluate if the running NS instance cannot meet the Requirement due to the error (e.g. if the erroneous VNFD parameters have impact on the design and therefore on the generated NSD) or not, and whether the NS should be re-designed and re-deployed.

Hereinbelow, both scenarios are discussed. In this analysis, it is assumed that the NS design approach, the Requirement and the Ontology are correct and cannot be the source of errors.

Scenario 1: NS Instance is Behaving According to the Requirements (Requirement)

In this scenario, the assumption is that the NS instance is running as expected according to the Requirement, and no issues have been detected (yet). However, at some point in time, the VNF vendor indicates that a VNFD involved in the NS design was not correctly describing the VNF and its instance is used now within the running NS instance. This implies that some VNFD parameters are erroneous and need to be changed. The decision of re-designing and re-deploying the NS depends on whether these parameters have an impact on the NSDescriptor, the generated NSD.

In the case where parameters are impactless at the metamodel level, since the erroneous parameters have no impact on the design and the NS instance is behaving as expected according to the Requirement, there is no action to take. For instance, the vendor might point out that the software image descriptor (SwImageDesc) used in the VNFD is erroneous. After analyzing the change impact of the SwImageDesc element on the NS Design process, it turns out that it is impactless as shown in FIG. 10B (d), since it is never considered in the design process. Changing this element would not impact the generated NSD, and therefore there is no need to re-design or from this perspective re-deploy the NS.

In the case where parameters are impactful at the metamodel level, the impact at the model level should be considered.

If parameters are impactful at the model level, as opposed to the previous case, re-designing the NS need to be considered even though it is running as expected according to Requirement. In this case, the erroneous parameters were used to design the NS and therefore they are impactful. For example, the vendor might report that an Instantiation Level element within the VNFD is erroneous and needs to be corrected. An Instantiation Level element specifies the number of instances of each VNFC within the VNF instance. The change impact analysis of this element finds it impactful (e.g., as shown in FIG. 10B (c)). This means that, while the NS instance shows no problem (yet), this does not preclude the possibility that the provisioning of VNFC instances is not done inefficiently (e.g. VNFC instances may be over-provisioned) and/or incorrectly (e.g. the parameter value may not have been used yet), and therefore the re-design of the NS may be considered in this case.

If parameters are impactless at the model level, since the parameters are impactful at the metamodel level but not at the model level, it is not straightforward to conclude whether the re-enactment of the NS Design is needed or not. A new parameter value might make a previously impactless parameter impactful after the change. Using the generated traces to analyze the impact of such parameters might provide a false negative result, in the sense that the impact analysis will suggest that changing the parameter would be impactless, even though it is not the case. For instance, the vendor might indicate that the name of a Vdu element referenced in the VNFD is erroneous. As shown in FIG. 10A (b), the analysis of the change impact of the Vdu name parameter on the NS Design process suggests that it is impactless. However, the reason may be that the Vdu with the incorrect name was not selected because it did not meet the requirements. On the other hand, the correct Vdu name might point to a VDU which meets the requirements, making the parameter impactful at the model level as well. In this case, if the NS design enactment is re-run with the changed parameter value and new traces are generated, the change impact analysis will suggest that this element is impactful. Thus, at this point, no conclusion can be made in this case from the analysis and it is better to re-enact the NS Design with the changed parameters.

Scenario 2: NS is not Meeting the Requirements (Requirement)

In this scenario the NS instance is not behaving as expected according to the Requirement. Similar to the previous scenario, the VNF vendor indicates that a provided VNFD is erroneous and requires changes. MAPLE-T can be used to try to determine if the erroneous behaviour of the NS instance is due to the erroneous VNFD or not.

In the case where parameters are impactless at the metamodel level, since the erroneous parameters of the VNFD are impactless (case shown in FIG. 10B (d)), it can be concluded that the erroneous behaviour of the NS instance is not due to the use of the erroneous VNFD in the NS design. It might be due to other NS management activities (instantiation, configuration, etc.), but the error did not originate from the VNFD parameters used in the design.

In the case where parameters are impactful at the metamodel level, similar to the first scenario, the impact at the model level is also considered.

If parameters are impactful at the model level (shown by the examples in FIGS. 10A (a) and 10B (c)), this means that the generated NSD is erroneous. Thus, it can be inferred that the misbehavior is possibly due to the incorrectly-designed NS, which was due to input errors (in the VNFDs). Then the NS needs to be re-designed and re-deployed.

If parameters are impactless at the model level, this means that the case is inconclusive. Even if the change impact analysis suggests that the parameters are impactless, it is not possible to know if this result is accurate or if it is a false negative. The only way to determine this is to re-enact and generate new traces.

A summary of the two scenarios, their different cases, and analysis results is shown in Table 1.

TABLE 1

Summary of VNFD Change Impact Analysis Results

| Impact Decision | Running NS Instance | |
|---|---|---|
| | No problem has been detected | Problems have been detected |
| Impactless at both metamodel and model levels | No re-design is required | NS instance misbehaviour does not originate from the parameter error in the design, no re-design is required |
| Impactful at both metamodel and model levels | NS needs to be re-designed (e.g., over-provisioning) | NS instance misbehaviour may originate from the parameter error. NS needs to be re-designed |
| Impactful at metamodel level and impactless at model level | Inconclusive, NS re-design needs to be considered | Inconclusive, NS re-design needs to be considered |

Here, only one NS was considered and the impact of erroneous VNFDs on its design and the behavior of its instances were analyzed. But the same analysis applies similarly to all NSs in which the erroneous VNFDs are involved. Moreover, one may undertake the huge task of analyzing all designed NSs including NSs where the VNFDs are not involved as this could be the result of exclusion due to the erroneous VNFDs. This is along the same lines as reconsidering the design of any NS once a new VNF is made available.

This approach was applied to an NFV case study, namely on the NS design, to carry out change impact analysis. The goal was to assess whether changes in the building blocks of a network service, the VNFs, have any impact on the process and the generated deployment templates.

Figure 11:
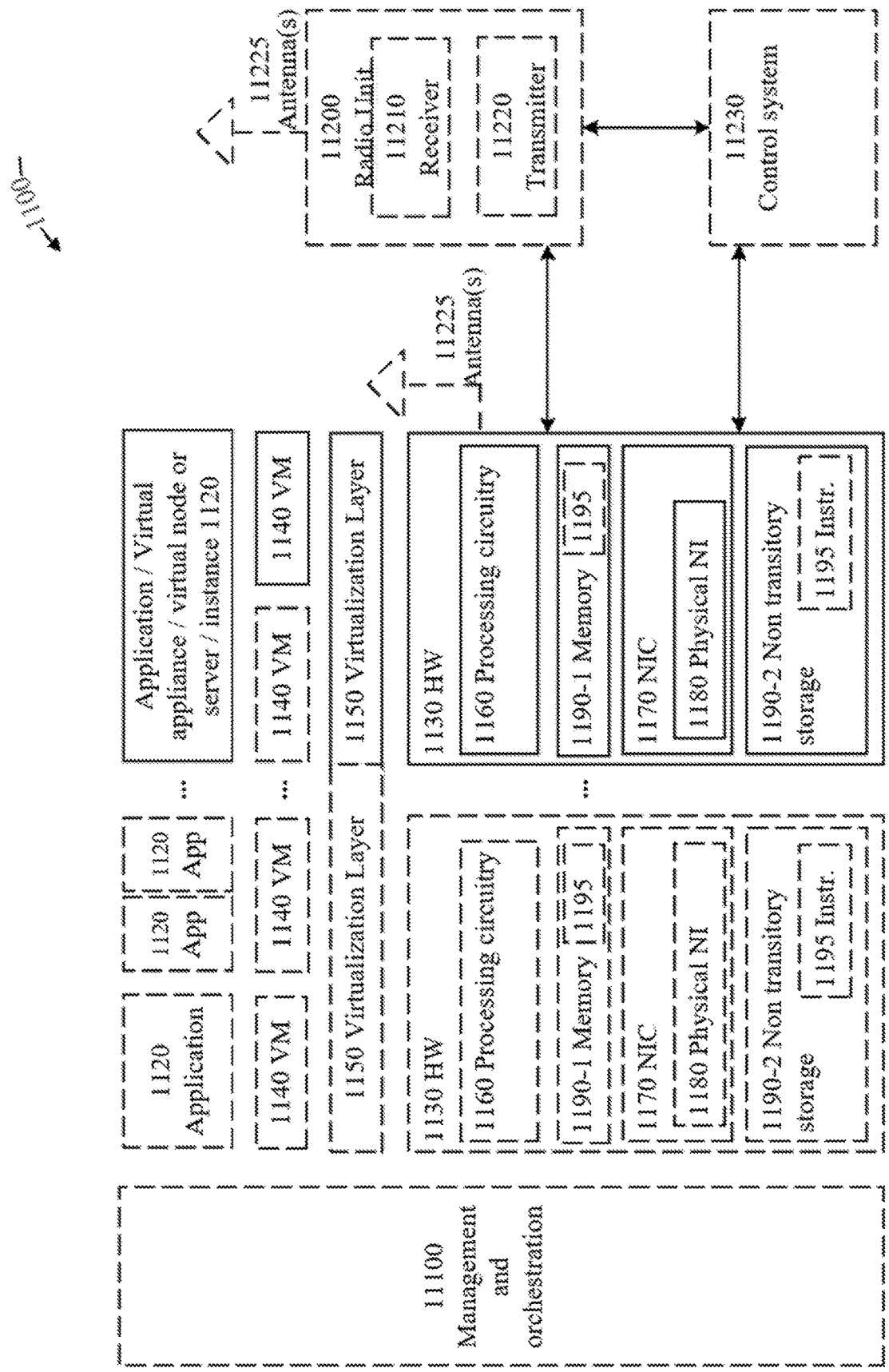
FIG. 11 is a schematic illustration of an example cloud environment in which the MAPLE-T approach may be deployed.

FIG. 11 is a schematic block diagram illustrating a virtualization environment 1100 in which some functions may be virtualized. As used herein, virtualization can be applied to a node or server (e.g., a virtualized base station or a virtualized radio access node) or to a device (e.g., a UE, a wireless device or any other type of communication device) and relates to an implementation in which at least a portion of the functionality is implemented as one or more virtual components (e.g., via one or more applications, components, functions, virtual machines or containers executing on one or more physical processing nodes in one or more networks).

Some or all of the functions described herein may be implemented as virtual components executed by one or more virtual machines or containers implemented in one or more virtual environments 1100 hosted by one or more of hardware nodes 1130. Further, when the virtual node is not a radio access node or does not require radio connectivity (e.g., a core network node), then the network node may be entirely virtualized.

Some functions described herein may be implemented by one or more applications 1120 (which may alternatively be called software instances, virtual appliances, network functions, virtual nodes, virtual network functions, etc.), or as part of management and orchestration (MANO) 11100, which may be operative to implement steps of some methods described herein. Applications 1120 run in virtualization environment 1100 which provides hardware 1130 comprising processing circuitry 1160 and memory 1190. Memory 1190 contains instructions 1195 executable by processing circuitry 1160 whereby application 1120 is operative to provide any of the relevant features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by the processing circuitry 1160. Each hardware devices may comprise one or more network interface controllers 1170 (NICs), also known as network interface cards, which include physical network interface 1180. Each hardware devices may also include non-transitory, persistent, machine readable storage media 1190-2 having stored therein software 1195 and/or instruction executable by processing circuitry 1160. Software 1195 may include any type of software including software for instantiating one or more virtualization layers 1150 (also referred to as hypervisors), software to execute virtual machines 1140 or containers as well as software allowing to execute functions described herein.

Virtual machines 1140 or containers, comprise virtual processing, virtual memory, virtual networking or interface and virtual storage, and may be run by a corresponding virtualization layer 1150 or hypervisor. Different instances of virtual appliance 1120 may be implemented on one or more of virtual machines 1140 or containers, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140 or to a container.

As shown in FIG. 11, hardware 1130 may be a standalone network node, with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via MANO 11100, which, among others, oversees lifecycle management of applications 1120.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, a virtual machine 1140 or container is a software implementation of a physical machine that runs programs as if they were executing on a physical, non-virtualized machine. Each of virtual machines 1140 or container, and that part of the hardware 1130 that executes that virtual machine, be it hardware dedicated to that virtual machine and/or hardware shared by that virtual machine with others of the virtual machines 1140 or containers, forms a separate virtual network elements (VNE).

Still in the context of NFV, Virtual Network Function (VNF) is responsible for handling specific network functions that run in one or more virtual machines 1140 or containers on top of hardware networking infrastructure 1130 and corresponds to application 1120 in FIG. 11.

One or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

Some signaling can be effected with the use of control system 11230 which may alternatively be used for communication between the hardware nodes 1130 and the radio units 11200.

Figure 12:
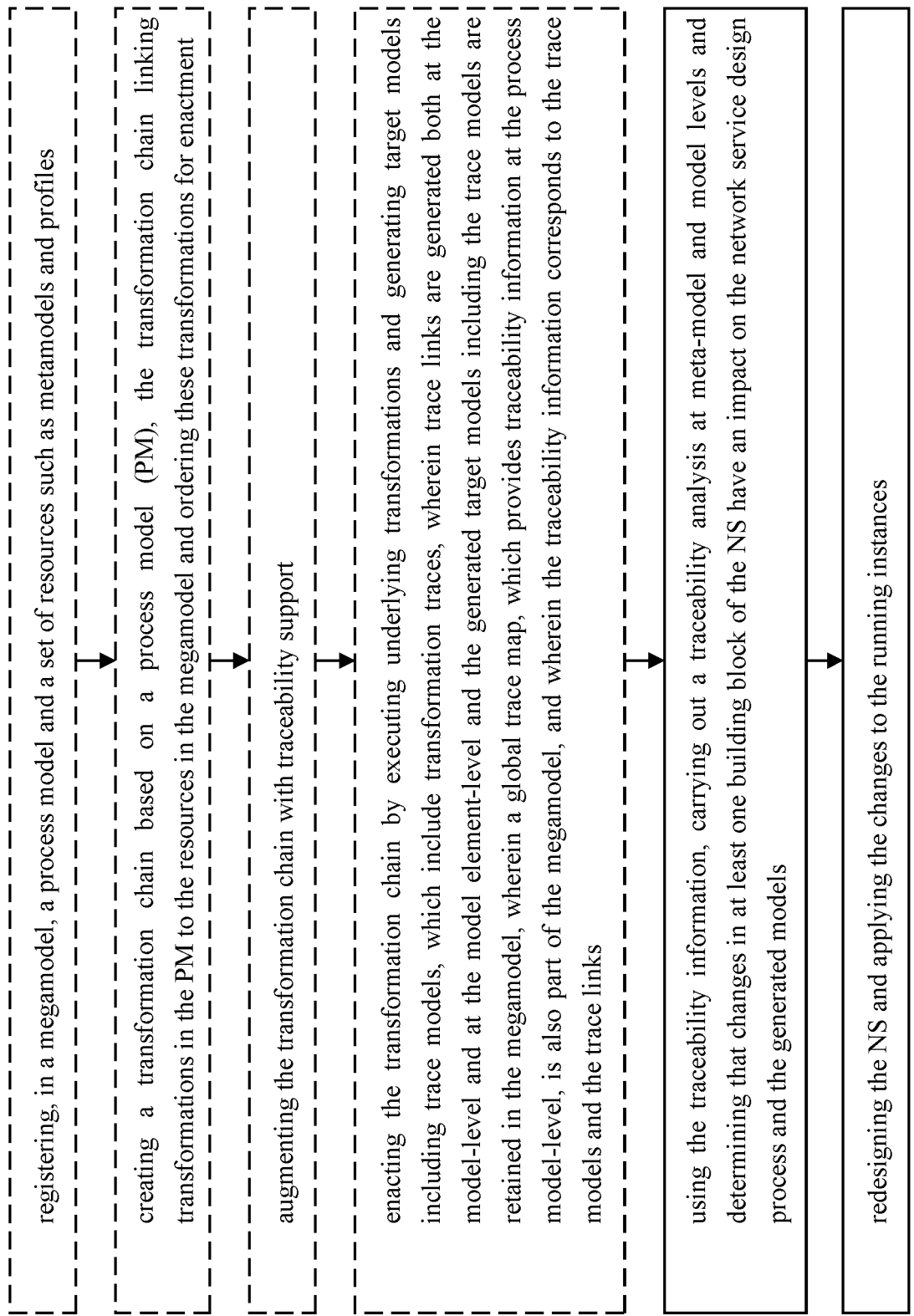
FIG. 12 is a flowchart of a method including some steps described herein.

FIG. 12 illustrates a method which may be executed in a hardware node 1130 or a software node 1140 such as illustrated in FIG. 11, such as a software instance, virtual appliance, network function, virtual node or as a virtual network function.

The method is for automatic generation of local and global traceability information during process enactment to carry out a traceability analysis at metamodel and model levels to assess whether changes in a building block of a network service (NS) have an impact on the network service design process and the generated models, and to redesign the NS and apply the changes as appropriate to the running instances. The method comprises:

registering, in a megamodel, a process model and a set of resources such as metamodels and profiles;

creating a transformation chain based on a process model (PM), the transformation chain linking transformations in the PM to the resources in the megamodel and ordering these transformations for enactment;

augmenting the transformation chain with traceability support;

enacting the transformation chain by executing underlying transformations and generating target models including trace models, which include transformation traces, wherein trace links are generated both at the model-level and at the model element-level and the generated target models including the trace models are retained in the megamodel, wherein a global trace map, which provides traceability information at the process model-level, is also part of the megamodel, and wherein the traceability information corresponds to the trace models and the trace links;

using the traceability information, carrying out a traceability analysis at metamodel and model levels and determining that changes in at least one building block of the NS have an impact on the network service design process and the generated models; and redesigning the NS and applying the changes to the running instances.

The traceability analysis may be a change impact analysis.

Figure 13:
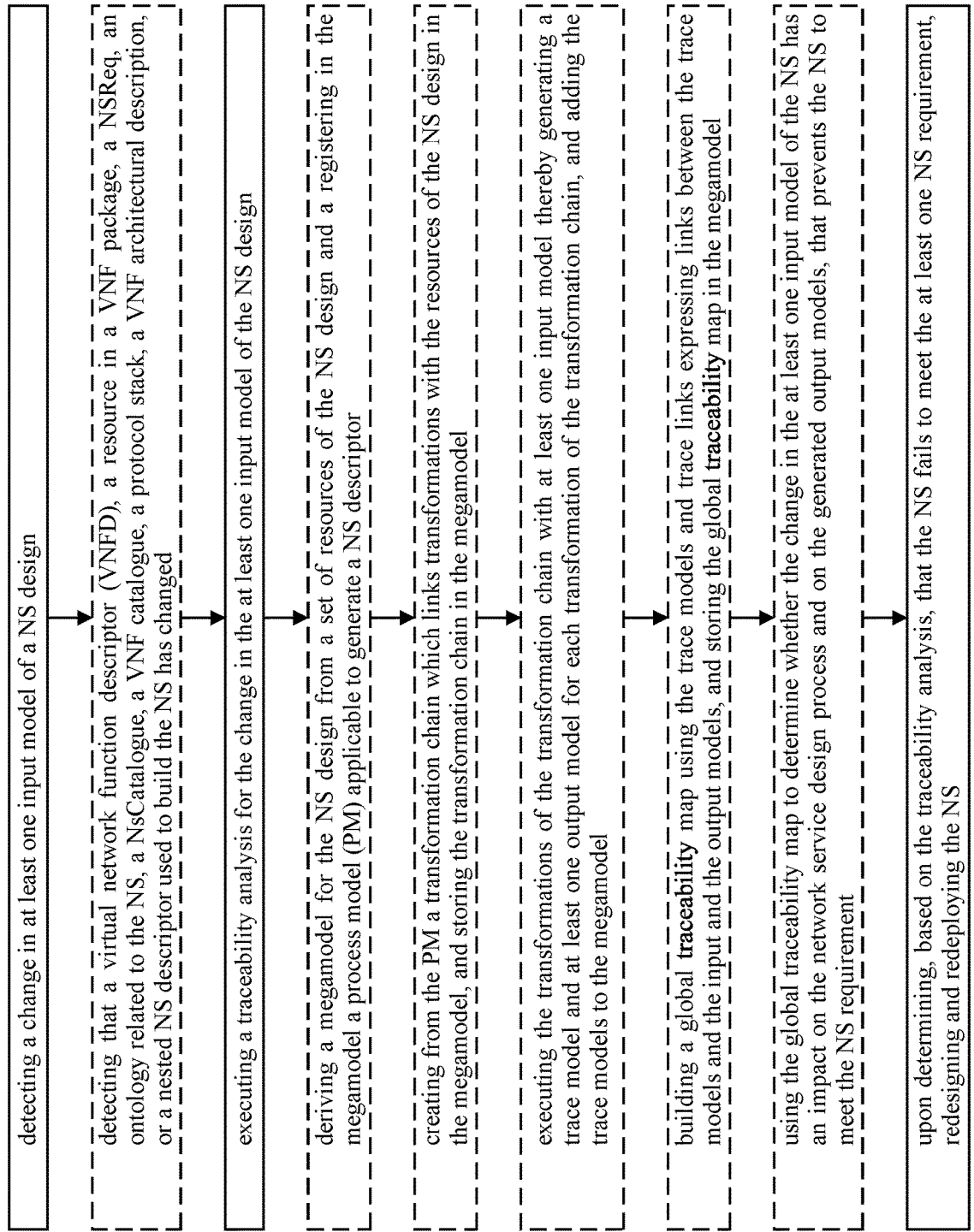
FIG. 13 is a flowchart of a method for redesigning and redeploying a network service (NS) upon determining that a running instance of the NS fails to meet at least one NS requirement

FIG. 13 illustrates a method for redesigning and redeploying a network service (NS) upon determining that a running instance of the NS fails to meet at least one NS requirement. The method comprises the steps of detecting a change in at least one input model of a NS design; executing a traceability analysis for the change in the at least one input model of the NS design; and upon determining, based on the traceability analysis, that the NS fails to meet the at least one NS requirement, redesigning and redeploying the NS.

Executing the traceability analysis may comprise deriving a megamodel for the NS design from a set of resources of the NS design and registering in the megamodel a process model (PM) applicable to generate a NS descriptor. Executing the traceability analysis may comprise creating from the PM a transformation chain which links transformations with the resources of the NS design in the megamodel, and storing the transformation chain in the megamodel. Executing the traceability analysis may comprise executing the transformations of the transformation chain with at least one input model thereby generating a trace model and at least one output model for each transformation of the transformation chain, and adding the trace models to the megamodel. Executing the traceability analysis may comprise building a global traceability map using the trace models and trace links expressing links between the trace models and the input and the output models, and storing the global traceability map in the megamodel. And executing the traceability analysis may comprise using the global traceability map to determine whether the change in the at least one input model of the NS design has an impact on the network service design process and on the generated output models, that prevents the NS to meet the NS requirement.

Detecting a change may comprise detecting that a virtual network function descriptor (VNFD), a resource in a VNF package, a NSReq, an ontology related to the NS, a NsCatalogue, a VNF catalogue, a protocol stack, a VNF architectural description, or a nested NS descriptor used to build the NS has changed.

The resources of the NS design may comprise any of: metamodels, profiles, model instances, model transformations and programs. When the PM is registered in the megamodel, a weave model may be created that binds the PM and the megamodel together and the PM may be mapped to the transformation chain using the weave model. Executing the transformations of the transformation chain may generate other artifacts including models, trace models, and other metadata, the artifacts being added to the transformation chain. Each trace model interconnects input and output models with trace links. When all the transformations of the transformation chain are executed, the megamodel may be updated with the generated trace models and the other artifacts.

Using the global traceability map to determine whether the change in the at least one input model of the NS has an impact on the network service design process and on the generated target models, that prevents the NS to meet the at least one NS requirement, may further comprise filtering the transformations at the metamodel level to identify transformations to be checked at the model level; and checking the input models, trace models and output models for the identified transformations using corresponding trace links, to determine whether the change has an impact.

In FIGS. 12 and 13, functions or actions illustrated with dashed lines may be optional and may or may not be executed.

Referring back to FIG. 11, if the system 1100 is an NFV system, the NS (re)design may be executed outside of the scope of NFV, which means in an application running in a VM or on a hardware. The result of the re-design and the deployment of the changes may then be given to the NFV Orchestrator 11100. This change may be given as a new NSD which is re-associated with the running NS instance(s) and possibly additional procedures which implement smoothly the changes. If no procedure is given, a termination of the NS instance may happen, and the NS may be restarted according to the new NSD.

There is provided a node 1130 for automatic generation of local and global traceability information during process enactment to carry out a traceability analysis at metamodel and model levels to assess whether changes in a building block of a network service (NS) have an impact on the network service design process and the generated models, and to redesign the NS and apply the changes as appropriate to the running instances, comprising processing circuits and a memory, the memory containing instructions executable by the processing circuits whereby the node is operative to execute any of the steps described herein.

There is provided a system, 1100, operative to redesign and redeploy a network service (NS) upon determining that a running instance of the NS fails to meet at least one NS requirement, whereby the system is operative to execute any of the steps according to the method described in relation with FIG. 13.

There is provided a non-transitory computer readable media having stored thereon instructions according to any of the steps described herein.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method for redesigning and redeploying a network service (NS) upon determining that a running instance of the NS fails to meet at least one NS requirement, comprising the steps of:
   detecting a change in at least one input model of a NS design;
   executing a traceability analysis for the change in the at least one input model of the NS design, comprising:
      deriving a megamodel for the NS design from a set of resources of the NS design and registering in the megamodel a process model (PM) applicable to generate a NS descriptor;
      creating from the PM a transformation chain which links transformations with the resources of the NS design in the megamodel, and storing the transformation chain in the megamodel;
      executing the transformations of the transformation chain with at least one input model thereby generating a trace model and at least one output model for each transformation of the transformation chain, and adding the trace models to the megamodel;
      building a global traceability map using the trace models and trace links expressing links between the trace models and the input and the output models, and storing the global traceability map in the megamodel; and
      using the global traceability map to determine whether the change in the at least one input model of the NS has an impact on the network service design process and on the generated output models, that prevents the NS to meet the NS requirement, further comprising:
         filtering the transformations at the metamodel level to identify transformations to be checked at the model level; and
         checking the input models, trace models and output models for the identified transformations using corresponding trace links, to determine whether the change has an impact; and
   upon determining, based on the traceability analysis, that the NS fails to meet the at least one NS requirement, redesigning and redeploying the NS.

2. The method of claim 1, wherein detecting a change comprises detecting that a virtual network function descriptor (VNFD), a resource in a VNF package, a NSReq, an ontology related to the NS, a NsCatalogue, a VNF catalogue, a protocol stack, a VNF architectural description, or a nested NS descriptor used to build the NS has changed.

3. The method of claim 1, wherein the resources of the NS design comprise any of: metamodels, profiles, model instances, model transformations and programs.

4. The method of claim 1, wherein when the PM is registered in the megamodel, a weave model is created that binds the PM and the megamodel together and wherein the PM is mapped to the transformation chain using the weave model.

5. The method of claim 1, wherein executing the transformations of the transformation chain generates other artifacts including models, trace models, and other metadata, the other artifacts being added to the transformation chain.

6. The method of claim 1, wherein each trace model interconnects input and output models with trace links.

7. The method of claim 5, further comprising, when all the transformations of the transformation chain are executed, updating the megamodel with the generated trace models and the other artifacts.

8. A system for redesigning and redeploying a network service (NS) upon determining that a running instance of the NS fails to meet at least one NS requirement, the system comprising processing circuits and a memory, the memory containing instructions executable by the processing circuits whereby the system is operative to:
   detect a change in at least one input model of a NS design;
   execute a traceability analysis for the change in the at least one input model of the NS design, wherein executing the traceability analysis comprises:
      deriving a megamodel for the NS design from a set of resources of the NS design and registering in the megamodel a process model (PM) applicable to generate a NS descriptor;
      creating from the PM a transformation chain which links transformations with the resources of the NS design in the megamodel and storing the transformation chain in the megamodel;
      executing the transformations of the transformation chain with at least one input model thereby generating a trace model and at least one output model for each transformation of the transformation chain and adding the trace models to the megamodel;
      building a global traceability map using the trace models and trace links expressing links between the trace models and the input and the output models, and storing the global traceability map in the megamodel; and
      using the global traceability map to determine whether the change in the at least one input model of the NS has an impact on the network service design process and on the generated output models that prevents the NS to meet the NS requirement, further comprising:
         filtering the transformations at the metamodel level to identify transformations to be checked at the model level; and
         checking the input models, trace models and output models for the identified transformations using corresponding trace links, to determine whether the change has an impact; and
   upon determining, based on the traceability analysis, that the NS fails to meet the at least one NS requirement, redesign and redeploy the NS.

9. The system of claim 8, wherein detecting a change comprises detecting that a virtual network function descriptor (VNFD), a resource in a VNF package, a NSReq, an ontology related to the NS, a NsCatalogue, a VNF catalogue, a protocol stack, a VNF architectural description, or a nested NS descriptor used to build the NS has changed.

10. The system of claim 8, wherein the resources of the NS design comprise any of: metamodels, profiles, model instances, model transformations and programs.

11. The system of claim 8, wherein when the PM is registered in the megamodel, a weave model is created that binds the PM and the megamodel together and wherein the PM is mapped to the transformation chain using the weave model.

12. The system of claim 8, wherein executing the transformation of the transformation chain generates other artifacts including models, trace models, and other metadata, the other artifacts being added to the transformation chain.

13. The system of claim 8, wherein each trace model interconnects input and output models with trace links.

14. The system of claim 12, further comprising, when all the transformations of the transformation chain are executed, updating the megamodel with the generated trace models and the other artifacts.

15. A non-transitory computer readable media having stored thereon instructions for redesigning and redeploying a network service (NS) upon determining that a running instance of the NS fails to meet at least one NS requirement, the instructions comprising:
- detecting a change in at least one input model of a NS design;
- executing a traceability analysis for the change in the at least one input model of the NS design, comprising:
  - deriving a megamodel for the NS design from a set of resources of the NS design and registering in the megamodel a process model (PM) applicable to generate a NS descriptor;
  - creating from the PM a transformation chain which links transformations with the resources of the NS design in the megamodel, and storing the transformation chain in the megamodel;
  - executing the transformations of the transformation chain with at least one input model thereby generating a trace model and at least one output model for each transformation of the transformation chain, and adding the trace models to the megamodel;
  - building a global traceability map using the trace models and trace links expressing links between the trace models and the input and the output models, and storing the global traceability map in the megamodel; and
  - using the global traceability map to determine whether the change in the at least one input model of the NS has an impact on the network service design process and on the generated output models, that prevents the NS to meet the NS requirement, further comprising:
    - filtering the transformations at the metamodel level to identify transformations to be checked at the model level; and
    - checking the input models, trace models and output models for the identified transformations using corresponding trace links, to determine whether the change has an impact; and
- upon determining, based on the traceability analysis, that the NS fails to meet the at least one NS requirement, redesigning and redeploying the NS.

* * * * *